(12) United States Patent
Balz

(10) Patent No.: US 6,321,884 B1
(45) Date of Patent: Nov. 27, 2001

(54) METHOD AND DEVICE OF ACTUATING AN ELECTROMECHANICALLY OPERABLE PARKING BRAKE

(75) Inventor: Juergen Balz, Huenstetten-Oberlibbach (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/471,582

(22) Filed: Dec. 23, 1999

(30) Foreign Application Priority Data

Dec. 23, 1998 (DE) .............................. 198 59 605

(51) Int. Cl.[7] .................................................. B60L 7/00
(52) U.S. Cl. ................................................... 188/161
(58) Field of Search .................. 188/72.1–72.3, 188/161–163, 156–158, 106 P, 106 R; 303/115.2

(56) References Cited

U.S. PATENT DOCUMENTS 6,000,507 * 12/1999 Bohm .................................. 188/158
6,158,558 * 12/2000 Bill ...................................... 188/162

FOREIGN PATENT DOCUMENTS 35 18 715   11/1986 (DE) .

* cited by examiner

Primary Examiner—Christopher P. Schwartz
Assistant Examiner—C. J. Bartz
(74) Attorney, Agent, or Firm—Rader, Fishman & Grauer PLLC

(57) ABSTRACT

The present invention relates to a method and a device for actuating an electromechanically operable parking brake which includes a brake unit and an electrically driven actuator which actuates the brake unit, and wherein electric current is delivered to the actuator for locking and/or releasing the parking brake. One important feature of the present invention is that the current delivery for the actuator is basically interrupted at least one time during the locking and/or releasing operation.

11 Claims, 2 Drawing Sheets

METHOD AND DEVICE OF ACTUATING AN ELECTROMECHANICALLY OPERABLE PARKING BRAKE

TECHNICAL FIELD

The present invention relates to vehicle parking brakes and more particularly relates to a method of actuating an electromechanically operable parking brake.

BACKGROUND OF THE INVENTION

An electromechanically operable parking brake is, for example, known from German Offenlegungsschrift DE 41 29 919 A1. This publication discloses a combination of an electric motor that acts as an actuator and a drum brake. The electric motor is arranged in the vicinity of the associated wheel brake or forms a structural unit together with the wheel brake.

In German application serial No. 197 12 046.7, which is not prior published, the above-mentioned parking brake has been improved in such a way that the rotor of the electric motor has a hollow design and radially encompasses a reduction gear coupled between the rotor and the brake unit. In this arrangement, the reduction gear is configured as a spindle drive, the spindle of which is coupled to the brake unit in a force-transmitting fashion, and the spindle nut of which is coupled to the rotor in a force-transmitting fashion. The spindle drive may be realized in a self-locking fashion or in a non-self-locking fashion. In the latter solution, an additional mechanical or electromechanical locking mechanism may be provided.

Further, a control unit for actuating, for example, an electric motor of a parking brake, which motor is designed as a d.c. motor, is disclosed in German application serial No. 198 17 891.3 which is not prior published. The control unit produces a pulse-width modulated corrective signal for the d.c. motor which provides a nominal pulse-duty factor independently of the magnitude of the supply voltage that actually prevails.

Basically, the electric motor is supplied with an alternating current of a defined amplitude in the case of an electric a.c. motor or, for example, with a pulse-width modulated corrective signal in the case of an electric d.c. motor until the parking brake has reached a defined locking force. The attainable locking force depends on the current rate supplied. For example, a locking force of 1800 to 2000 N can be realized for a current rate of 20 ampere in the parking brakes.

An object of the present invention is to increase the locking force while the current supplied is minimized.

In the method of the present invention, the current supplied to the electric motor is basically interrupted at least one time during the locking and/or release operation. A control unit in the parking brake of the present invention is designed so that it basically interrupts the current supplied to the actuator at least one time during the parking and/or release operation.

More specifically, this means that for one individual locking or release operation, current is delivered to the actuator for a defined period of time, and subsequently is interrupted for a defined duration or at least decreased so greatly that this can be called an interruption, and finally the current is supplied again for a defined time. These interruptions may be repeated, if necessary.

In this arrangement, it is insignificant in which way the current is supplied to the actuator. Alternating current is supplied when the actuator is configured as an a.c. motor, and a pulse-width modulated current or a direct current is supplied when the actuator is a d.c. motor.

Principally, a device is called an actuator which executes a mechanical movement when a current is applied. The device may be an electric motor, an electric magnet with a movable armature plate, or a similar element. The following description refers only to the case of an electric motor being the actuator, which should not be considered a limitation though.

The pauses of a pulse-width modulated corrective signal are not generally considered as an interruption in the sense of the present invention. The pulses sent in pulse-width modulation are repeated in a frequency which is so high that the d.c. motor which acts as a low-pass filter is constantly driven, and thus cannot follow the pulse variations by way of a change in motion. This is the reason why it is not generally possible in this case to speak of an interruption of the current supplied.

Advantageously, a great amount of locking force at a minimum rate of current is achieved in the present invention. The result is that especially the costs in terms of power supply can be minimized.

It is preferred that initially the actuator is furnished uninterruptedly with a current up to a defined holding value of the locking force. Typically, the current which flows through an electric motor in the capacity of an actuator when starting from standstill proceeds in such a manner that after an initial maximum current amplitude for start-up of the motor there follows a current amplitude drop at low load which rises with increasing locking force due to the rising load. The locking force is increased up to a determined holding value. Due to the uninterrupted current supply up to this holding value, advantageously, the brake is quickly actuated and not stopped in positions in which the parking brake has not yet been tightened.

Preferably, the current supplied to the actuator is repeatedly interrupted when the holding value is reached. It is advantageously achieved thereby that the locking force can be increased successively to very high values.

Preferably, the pauses of interruption are chosen to be so long that the locking force exerted by the brake unit adopts a constant value in the pauses. With this variation of the locking force, the material which is stressed by the locking operation is given sufficient time for relief so that the electric motor, due to the clearances of parts of the transmission mechanism which occur caused by the material relief, is able to briefly accelerate and, thus, can supply a sufficient torque for the following locking pulse.

Preferably, a stepped variation of the locking force is adjusted by the appropriate selection of the interruption period and/or the duration of the renewed current supply. Advantageously, this measure permits reaching an optimum in the total time for the locking operation and the attainable locking force depending on the accelerated masses and the material elasticity.

Preferably, the rate of current supplied to the actuator is limited towards the top. In a combination with the locking operation according to the present invention, the same amount of locking force can be achieved with a rate of current that is reduced compared to the state of the art. The maximum current flowing can be limited in such a fashion that the electric motor can advantageously be driven with a low-cost control unit. This control unit requires only inexpensive power transistors, for example, instead of the costly power transistors used in a pulse-width modulation. Especially with respect to the back-up battery which is necessary for an emergency actuation this permits saving costs drastically. When lithium cells are e.g. used as a back-up battery in the prior art, the present invention permits dividing the number of battery cells by two, compared to the state of the art. More particularly, the need for a pulse width modulation is eliminated.

DETAILED DESCRIPTION OF THE PREFERRED EMBODIMENTS

Figure 1:
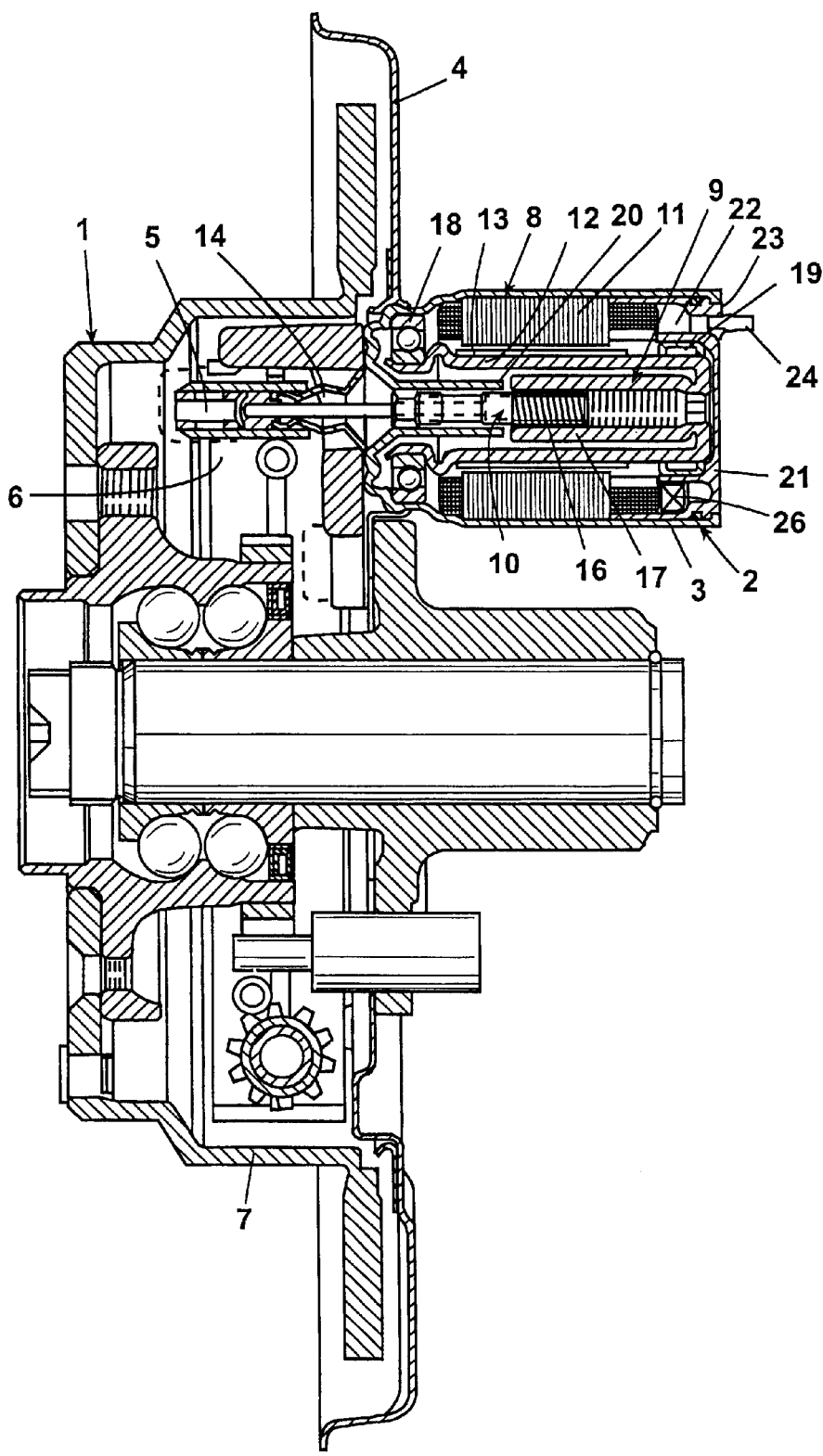
FIG. 1 is an axial cross-sectional view of an embodiment of an electromechanically operable parking brake.

FIG. 1 shows an electromechanically operable parking brake which basically includes a per se known drum brake 1 and an actuating unit 2 in a housing 3. The actuating unit 2 is in a force-transmitting connection to an expanding lock 5 which mechanically actuates two brake shoes. Only one of the brake shoes is shown in FIG. 1 designated by reference numeral 6. The brake shoes 6 are moved into engagement with a brake drum 7 when the brake is locked.

The actuating unit 2 comprises an electric motor 8, a reduction gear 9, and a force-transmitting element 10 which is coupled to the expanding lock 5 by way of a steel cable line 14. The steel cable line 14 has a (non-illustrated) drawbar eye at its end close to the expanding lock, while its other end is press-fitted or squeezed in the force-transmitting element 10.

The electric motor 8 shown in the embodiment of FIG. 1 is realized in the form of an electronically commutated motor, yet other designs are also possible (for example, a brush motor operated by direct current). A stator 11 of the electric motor 8 is immovably arranged in the housing 3 of the actuating unit 2, and its rotor 12 is favorably designed as a tubular sheet-metal part, onto the surface of which permanent magnet segments 13 are cemented. In this case, the end of the rotor 12 which faces the brake drum 7 is supported in a fixed bearing 18, and its end which is averted from the brake drum 7 is supported in a movable bearing 19. The reduction gear 9 is preferably arranged coaxially to the rotor 12 and radially encompassed by the rotor.

In the embodiment shown, the reduction gear 9 is designed as a self-locking spindle drive, the spindle 16 of which forms the force-transmitting element 10, and the spindle nut 17 of which is formed by a tubular part which is arranged coaxially to the rotor 12 and designed integrally with the rotor 12 in a preferred fashion. An axial tubular extension 20 of the housing 3 which extends into the interior of the rotor 12 serves as an antirotation mechanism of the spindle 16. The extension 20 has a polygonal inner profile that cooperates with the matingly shaped end of the spindle 16.

A bearing cover 21 in which the movable bearing 20 is arranged defines in the housing 3 of the actuating unit 2 an annular hollow space 22 which can accommodate, for example, an electronic control unit 26. Also, a cable duct 23 is provided in the bearing cover 21 through which a preferably extrusion-coated connecting line 24 can extend which leads to the stator 11 of the electric motor 8 and/or to the electronic control unit.

In an embodiment not shown in FIG. 1, the reduction gear can be designed as a non-self-locking spindle drive or a ball screw, respectively. The ball screw can include a threaded spindle and a ball screw nut that is preferably pressed into the rotor. The rotational movement of the ball screw nut is converted into a translational movement of the threaded spindle by means of rows of balls. A locking mechanism which prevents loosening of the parking brake can be provided in addition.

In another embodiment not shown, the electric motor can be a d.c. brush motor, the stator of which is formed by permanent magnet segments arranged in the housing of the actuating unit. The rotor that receives a current by way of a collector is formed by a tube which is supported at two points and carries an armature winding. The end of the tube close to the brake drum is realized in the form of a sun wheel with a planetary gear that is arranged between the electric motor and the reduction gear in terms of effect. The sun wheel drives planet wheels which revolve in a ring gear that is machined into the inner side of the housing and forms part of said housing.

The electronic control unit 26 can e.g. include in a known fashion a pulse width modulator which generates a pulse-width modulated corrective signal for the d.c. brush motor wherein the information about the desired corrective signal is contained in the pulse width. The current variation against time supplied to the electric motor by the control unit will be explained hereinbelow with reference to FIG. 2.

Other embodiments for the actuator or electric motor and/or the reduction gear which are not illustrated or described are easily possible. Instead of an electric motor, a magnet can be used as well which, for locking the brake, draws an armature plate blocked in its return movement, for example.

Figure 2:
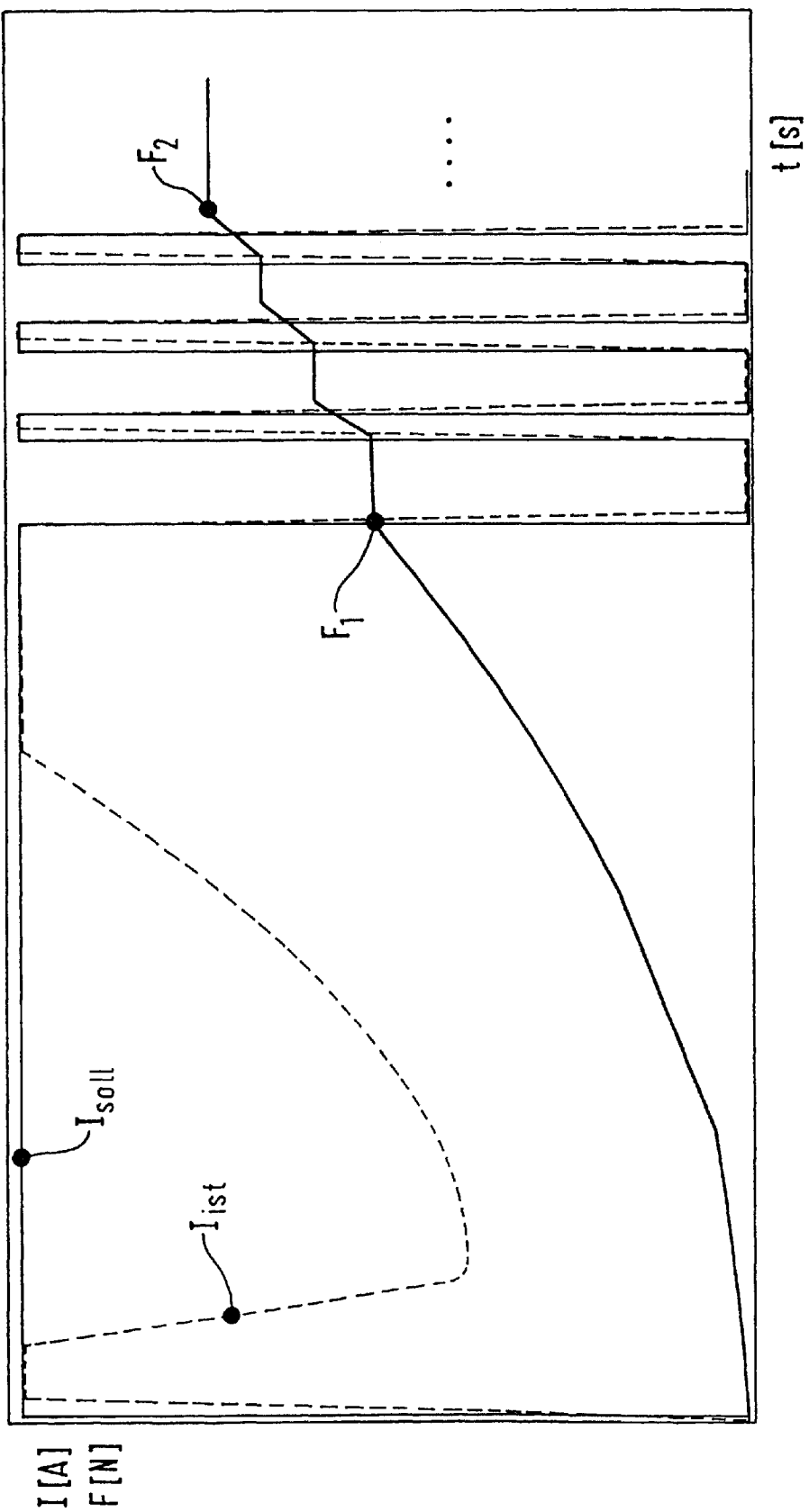
FIG. 2 is a flow chart depicting the variation of current against time which is supplied by the control unit to the electric motor.

FIG. 2 shows a flow chart in which the nominal current $I_{soll}$ which is to be impressed on the electric motor by the control unit, the actual value of the current $I_{ist}$ and the locking force F are plotted on the abscissa, and the time is plotted on the ordinate.

Initially, the control unit impresses on the electric motor a current $I_{soll}$ which is limited in the rate of current (10 ampere, for example). Instead of a predetermined rate of current, a pulse-width modulated corrective signal can be furnished in the case of a d.c. motor having a pulse width which is limited accordingly towards the top. This current $I_{soll}$ is delivered until the load, that is the parking brake, is actuated up to a holding value at a defined locking force $F_1$. The duration can be prestored in the control unit for the envisaged type of brake, for example, or it can be measured by a suitable sensing means (not shown). In the case of motor control, the duration may also be derived from the variation of the actual value of the current $I_{ist}$ supplied. Among other things, this will be explained in the following.

Shortly after application of the current for starting the electric motor, the actual value $I_{ist}$ of the current is at its maximum until the electric motor has reached a defined acceleration or speed. After the drive torque has been overcome, the motor load as well as the actual current value $I_{ist}$ will drop. Both values will subsequently rise again with increasing locking force F.

Finally, the actual current value $I_{ist}$ reaches its maximum value again which is fixed by a current limiter provided in the control unit. The locking force rises still further by continuous delivery of a current $I_{soll}$ at the maximum rate of current until finally the locking force $F_1$ at the holding value is reached. At this point of time (for example, 500 msec after start of the electric motor) the current supply is interrupted (for example, for approximately 50 msec). Subsequently, a current $I_{soll}$ is delivered again for a short time (for example, for approximately 20 msec). During this time the electric motor is again accelerated from standstill and transmits a torque to the parking brake which makes the locking force rise further. Thereafter, the sequence composed of interruption and repeated current supply is repeated several times.

In general, it can be taken from FIG. 2 that the actual value $I_{ist}$ of the current slightly lags behind the nominal value $I_{soll}$. Further, the number of current interruptions or reductions shown in FIG. 2 is not final. Depending on the case of requirement, a greater or smaller number of current interruptions may be necessary.

As can be seen from FIG. 2, the locking force continues to rise during each sequence even after the current delivery phase is interrupted until it adopts a constant value during the interruption period. This 'lagging' increase is due to the accelerated masses.

The periods of time for the interruption and the renewed current delivery can be optimized with respect to the respectively prevailing locking force. Thus, a bottom limit for the time of the renewed current delivery can be seen in the response time which it takes the electric motor to put its movable mass and that one of the transmission unit into motion. With the locking force rising, the times for a renewed current delivery can be shortened because the velocity amplitudes of the electric motor will also drop due to the decreasing clearances on parts of the drive. Under certain circumstances, the locking force can be measured in this respect.

The times for the interruptions can also be adapted accordingly, for example, with respect to the time that is necessary for tension relief of the material, which latter time can depend on the locking force.

In the example shown in the embodiment of FIG. 2, a final value of the locking force $F_2$ is reached by three times repeating the interruption sequence. Compared to control units of the state of the art, the repeated interruption and renewed current delivery according to the present invention permits achieving locking forces in a magnitude which cannot be reached in prior art methods with an uninterrupted current delivery, not even with substantially higher currents.

As has been indicated hereinabove, a possible explanation for this phenomenon can be seen in the clearances on mating parts of the drive (for example, the planetary gear, etc.) in a combination with the starting torque of the electric motor so that a pulsed further rotation of the drive (for example, the spindle drive) permits great locking forces or cable forces (e.g. in excess of 3000 N).

In locked brakes, the method of the present invention can also be used for the release of the parking brake in case an increased starting torque is necessary, e.g. after a long immobilization time.

Preferably, inexpensive power transistors can be used in the control unit which do not have to generate high currents due to the current limitation. Especially with respect to an emergency operation of the parking brake by way of a back-up battery, the control unit may have a current limiter which limits the current towards the top so that, different from the state of the art, back-up batteries can be employed which have a greatly reduced storage capacity. This permits drastically reducing the total costs for the control unit and the back-up battery (for example, a lithium battery).

What is claimed is:

1. Method of actuating an electromechanically operable parking brake which includes a brake unit and an electrically driven actuator that actuates the brake unit and wherein an electric current is delivered to the actuator for locking or releasing the parking brake, comprising the step of:
    interrupting the current delivered to the actuator at least once during actuating the parking brake; and
    limiting the current delivered to the actuator as the current approaches a predetermined upper limit.

2. Method as claimed in claim 1, further including the step of initially delivering the current to the actuator without interruption until a predefined locking force is reached.

3. Method as claimed in claim 2, wherein the interrupting step is repeated at least twice after the predefined locking force has been reached.

4. Method as claimed in claim 3, wherein the locking force becomes constant during the interruptions in the current.

5. Method as claimed in claim 3, wherein, after an interruption, the locking force begins to increase when the current is initially delivered to the actuator.

6. Electromechanically operable parking brake comprising:
    a brake unit,
    an electrically driven actuator which actuates the brake unit, and
    an electronic control unit which delivers current to the actuator, wherein the electronic control unit is configured so that interrupts the current delivered to the actuator at least once during actuating the parking brake and the electronic control unit limits the current delivered to the actuator as the current approaches a predetermined upper limit.

7. Method of actuating an electromechanically operable parking brake which includes a brake unit and an electrically driven actuator that actuates the brake unit and wherein an electric current is delivered to the actuator for locking or releasing the parking brake, comprising the step of:
    interrupting the current delivered to the actuator at least once during actuating the parking brake; and
    delivering the current to the actuator without interruption until a predefined locking force is reached.

8. Method as claimed in claim 7, wherein the interrupting step is repeated at least twice after the predefined locking force has been reached.

9. Method as claimed in claim 8, wherein the locking force becomes constant during the interruptions in the current.

10. Method as claimed in claim 8, wherein, after an interruption, the locking force begins to increases when the current is initially delivered to the actuator.

11. Method as claimed in claim 7, further including the step of limiting the current delivered to the actuator as the current approaches a predetermined upper limit.

* * * * *